Dec. 6, 1927.
A. C. HAYDEN
1,651,952
APPARATUS FOR MAKING HEELS
Filed Feb. 25, 1926   2 Sheets-Sheet 1
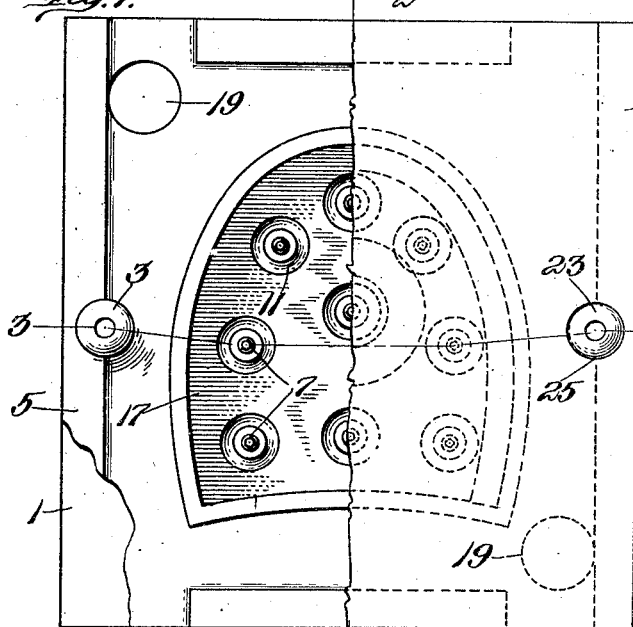
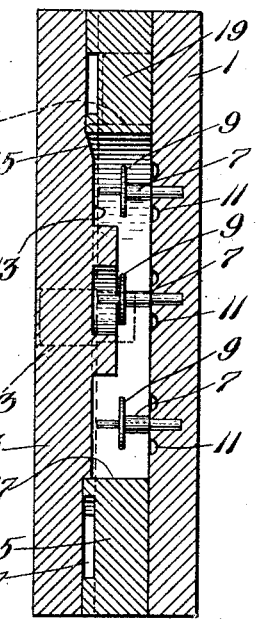
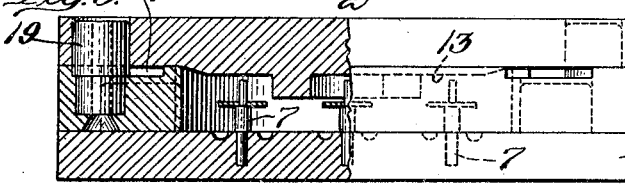
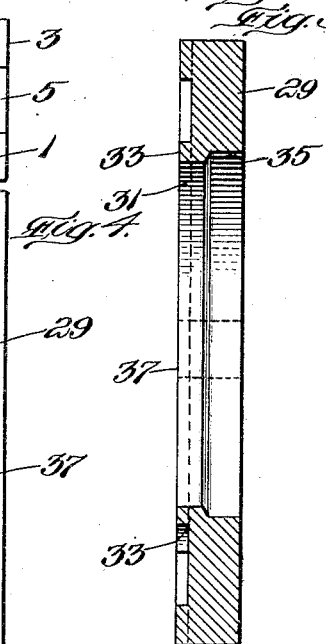
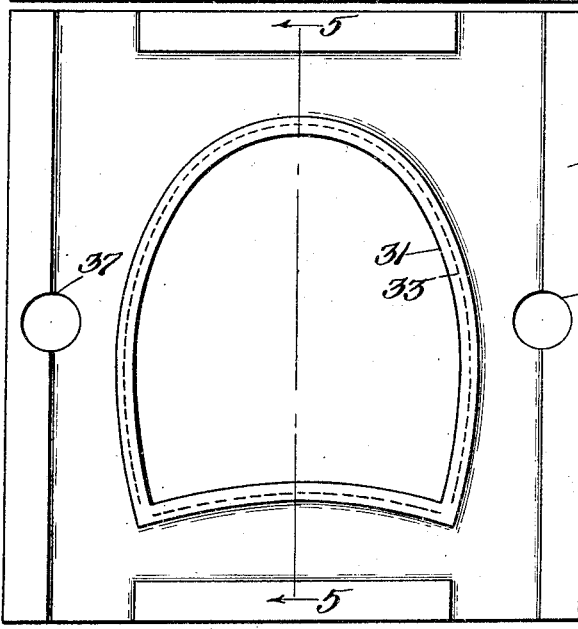
Inventor:
Arthur C. Hayden,
by Henry T. Williams,
Atty

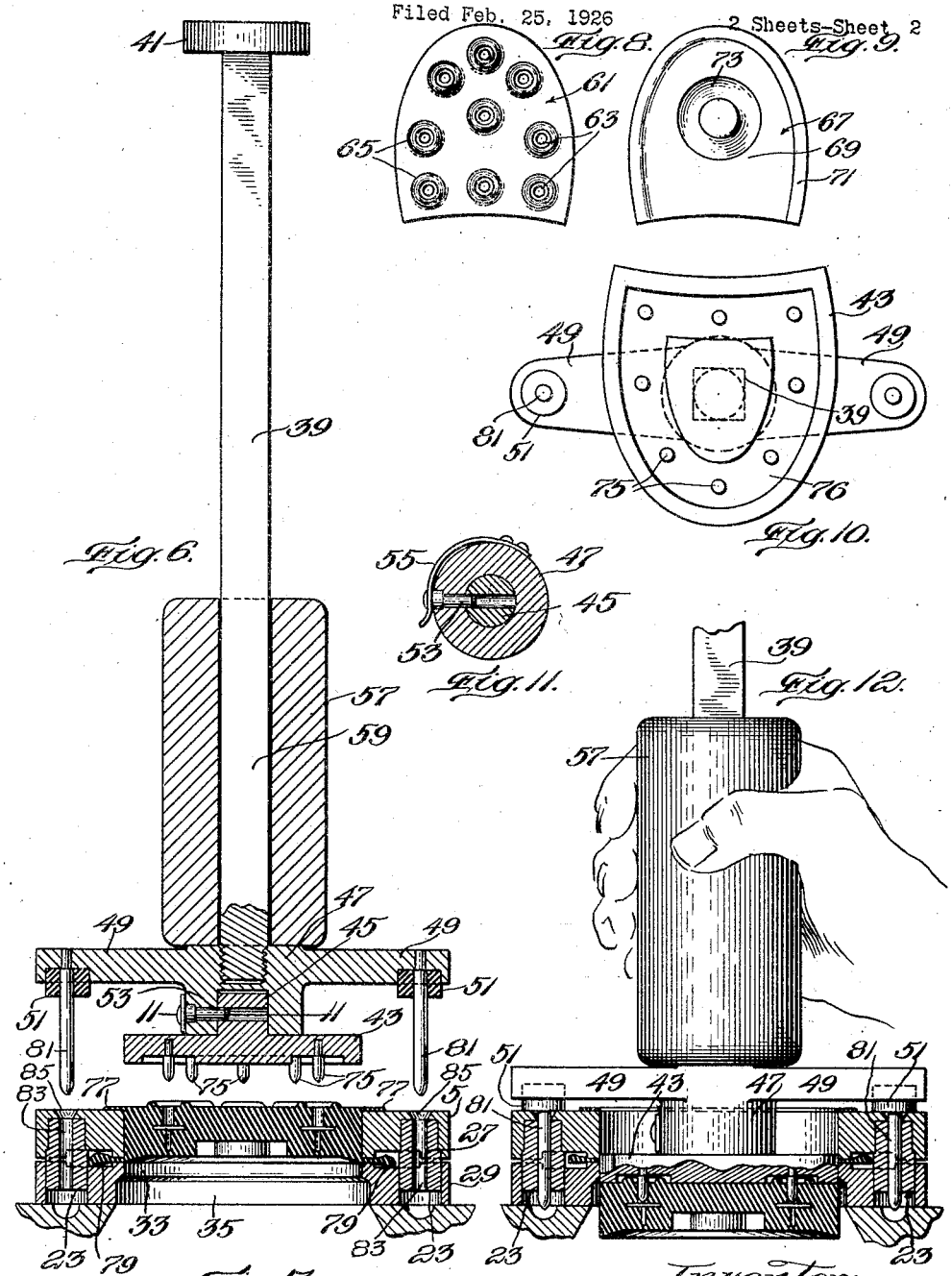

Patented Dec. 6, 1927.

1,651,952

UNITED STATES PATENT OFFICE.

ARTHUR C. HAYDEN, OF BROCKTON, MASSACHUSETTS.

APPARATUS FOR MAKING HEELS.

Application filed February 25, 1926. Serial No. 90,495.

The invention to be hereinafter described relates to apparatus for making rubber heels and the like.

Heretofore rubber heels have been made in a mold consisting of a center plate, an insert plate and a boss plate. The center plate has a hole therein shaped to conform to the edge contour of the heel. The insert plate has pins projecting therefrom for producing the nail receiving holes in the heel, and the pins are surrounded by recesses for producing the buttons on the insert face of the heel. The boss plate has a rounded projection and a tapered margin for forming the boss face of the heel. These three plates are assembled with the center plate between the insert and boss plates and are brought into proper registration by dowels and holes in the plates. The mold may be constructed to form a number of heels, but it will suffice herein to describe the portion of the mold used in the production of a single heel, since all are made in the same manner.

In making a rubber heel by use of the mold described, a slug or rubber commonly called a biscuit is introduced into the mold, and then the latter is placed in a steam press and subjected to pressure, thereby causing the biscuit to fill and assume the shape of the space in the mold, and the biscuit is somewhat larger than necessary to fill the space in the mold, so that when the plates are subjected to pressure, excess rubber exudes out and forms flanges between the plates in the planes of the insert and boss faces of the rubber heel. Then the mold is taken from the press and the insert and boss plates are removed from the center plate, but the rubber heel is retained in the center plate by the flanges which overlap the faces of the center plate. Heretofore, it has been the practice to remove the heel from the center plate by means of a tool in the form of a metal rod about eight inches long and having a rubber tip. This tool is grasped by the operator and brought down with a sharp blow against the boss face of the heel, thereby ejecting it from the hole in the center plate. After the heel has cooled sufficiently it is presented to a trimming machine having a pair of disk cutters and given proper manipulation by the operative to trim the flanges of excess rubber from the heel.

There are objections to the above described apparatus and method. In pounding the heel out from the hole in the center plate, the heels are liable to be cracked or otherwise injured, making it necessary to examine and sort the heels to separate the good ones from the poor ones. The operative in pounding the heel from the hole in the center plate is liable to strike the tool against the edges of the center plate surrounding the hole therein with consequent mutilation of the plate and shortening of the useful life of the plate. And these operations are time consuming, expensive and otherwise objectionable.

The aim and purpose of the present invention is to overcome the aforesaid objections. To accomplish this, apparatus is provided which includes a trimmer plate adapted for assembly with the center plate, and an improved ejector is provided. The trimmer plate is heated to about the same temperature as that of the center plate coming from the steam press, in order that contact of the trimmer plate with the center plate may not cool the latter and cause shrinkage of the rubber heel in the hole in the center plate. The ejector is presented to the insert face of the rubber heel, and by means of a hammer on the ejector a blow is imparted to the heel which forces it from the hole in the center plate through the hole in the trimmer plate, and the flanges of excess rubber on the heel are sheared therefrom.

The character of the invention may be best understood by reference to the following description of one good form of apparatus embodying the invention shown in the accompanying drawings, wherein Fig. 1 is a plan of the mold, parts being broken away to disclose portions of the plates;

Fig. 2 is a vertical section taken on line 2—2 of Fig. 1;

Fig. 3 is a vertical section taken on line 3—3 of Fig. 1;

Fig. 4 is a plan of the trimmer plate;

Fig. 5 is a vertical section taken on line 5—5 of Fig. 4;

Fig. 6 is a vertical section through the trimmer ejector;

Fig. 7 is a vertical section through the center plate and trimmer plate and a heel in the hole in the center plate, the parts being in position to have the ejector drive the heel from a hole in the center plate and shear the flanges from the heel;

Figs. 8 and 9 are respectively views of the insert and boss faces of a rubber heel;

Fig. 10 is an end view of the ejector;

Fig. 11 is a transverse section taken on line 11—11 of Fig. 6; and

Fig. 12 shows a sectional view of the center plate, trimmer plate and a rubber heel, a portion of the ejector being shown in side elevation and a portion in section to illustrate the position of the ejector after forcing the heel through the holes in the plates.

Referring to the drawing, the mold for forming the heels comprises an insert plate 1, a boss plate 3 and a center plate 5 between the insert and boss plates. The insert plate has pins 7 projecting therefrom carrying the usual washers 9 located in the body of the heel and adapted to cooperate with the heads of nails used for securing the heel to a shoe. Surrounding the pins 7 are annular recesses 11 in the insert plate for forming the buttons on the insert face of the heel.

The boss plate 3 has a projection 13 with a bevelled margin 15 for forming the boss face of the heel. The center plate has a hole 17 therein shaped to conform to the edge contour of the heel, and the hole has a depth corresponding to the thickness of the heel.

To insure proper registration of the plates, the insert plate has a pair of dowels 19 projecting therefrom adjacent diagonally opposite corners of the plate and adapted to enter corresponding holes 21 in the center plate. The center plate has a pair of dowels 23 adapted to enter corresponding holes 25 in the boss plate. The center plate has a groove 27 (Fig. 3) surrounding the hole in the plate and adapted to receive the excess rubber exuding between the center and boss plates when the mold is subjected to pressure.

The trimmer plate 29 (Figs. 4 and 5) has a hole 31 therein of the same size and shape as the hole in the center plate, and surrounding the hole 31 is a narrow shearing rim 33. The trimmer plate hole 31 has an enlarged portion 35 to allow ready escape of the heel from the trimmer plate, as more fully hereinafter described. To insure proper registration of the center and trimmer plates, a pair of holes 37 are provided in the trimmer plate to receive the dowels 23 of the center plate.

The trimmer ejector comprises a handle in the form of a rod 39 (Figs. 6 and 11) having a knob 41 at one end thereof and a head 43 at the opposite end therefor. The head has a lug 45 adapted to fit in a correspondingly shaped recess in a boss 47 threaded on one end of the rod 39. Projecting from said boss are arms 46 provided with rubber buttons 51. Suitable means may be provided detachably to connect the head 43 with the boss 47, in order that heads of different sizes and construction may be applied to the tool. This means, in the present instance comprises a pin 53 (Fig. 6 and 11) yieldingly held in registering holes in the boss and lug by a leaf spring 55 carrying the pin and having one end secured to the boss. When it is desired to remove the head, the pin is pulled outward from the hole in the lug, thereby allowing the head to be slipped from the boss. Mounted on the rod 39 is a hammer 57 having a hole 59 therein, said rod and hole being square in section or otherwise formed to prevent the hammer from turning on the rod.

A usual rubber heel (Figs. 8 and 9) has an insert face 61 provided with holes 63 through which the attaching nails may be inserted, and projecting up from the holes are buttons 65. The heel has a boss face 67 with a shallow depression 69 and a wide margin or boss 71. At the center of the heel is an annular hole 73 usually provided for economy of material.

The head 43 of the ejector is shaped to conform to the contour of the center plate hole and to fit therein. The head may have insert pins 75 projecting therefrom and appropriately disposed to enter the insert holes 63 of the rubber heel, thereby to insure proper registration of the head with the center plate hole. The head may have a groove 76 (Fig. 10) of sufficient depth to receive the buttons 65 on the insert face of the heel, said groove being adapted to accommodate buttons of different sizes and shapes.

In the use of the apparatus, a rubber biscuit is introduced into the mold consisting of the insert, boss and center plates, the thickness of the biscuit being somewhat greater than the depth of the hole in the center plate. Then the mold is placed in the steam press and subjected to pressure, thereby causing the biscuit to spread and completely fill the space in the mold, and in the course of this operation a thin flange 77 of rubber (Fig. 7) will exude out between the insert plate and center plate in the plane of the insert face of the heel, and a substantially thicker and larger flange 79 will exude out between the boss and center plates and enter the groove 27 in the center plate provided for the excess rubber.

After the mold is removed from the steam press and while still in heated condition, the insert and boss plates are removed from the center plate, and the latter is superposed upon the trimmer plate 29 in the position shown in Fig. 7 with the insert face of the heel uppermost. The trimmer plate is previously heated so that when the center plate is presented thereto, the trimmer plate will not reduce the temperature of the center plate and cause local shrinkage of the heel in the hole of the center plate. The ejector is presented to the heel, and the insert pins 75 of the head 43 are inserted in the insert holes of the heel, thereby to insure accurate registration of the head 43 with the hole in the center plate. Then the hammer 57 is grasped, slid upward along the rod 39 and then brought down against the boss 47 with a sharp blow (Fig. 12), thereby causing the periphery of the head 43 to cooperate with the upper edge of the center plate hole and shear the excess rubber flange 77 from the heel, and at the same time cause the shearing rim 33 of the trimmer plate to cooperate with the lower edge of the center plate hole and thereby shear the excess rubber flange 79 from the heel. The heel is forced by the blow on down through the hole of the trimmer plate (Fig. 12) and ejected therefrom. When the hammer blow is imparted, the arms 49 of the ejector will move downward until arrested by engagement of their rubber buttons 51 with the upper surface of the center plate (Fig. 12). When the ejector is in this position, its head 43 will be down so that its lower face is somewhat beneath the upper portion of the hole 31 in the trimmer plate, and the rubber heel is in the larger portion of the hole, so that it will escape freely therefrom. The downward limiting of the ejector by the arms 49 insures that the head 43 will not move down into the larger portion of the hole 31, and thus prevents any liability of the head catching against the shoulder formed at the juncture between the smaller and larger portions of the hole 31 such as might interfere with ready withdrawal of the head up through the hole in the center plate. Since the head on presentation to the insert face of the heel engages the latter throughout the margin and at the center of the heel, when the blow is imparted to the ejector hammer, the pressure is desirably distributed on the heel and prevents any possibility of cracking or otherwise injuring the heel in the course of the trimming and ejecting operations.

Some types of heels do not have nail receiving holes, and in such case the head 43 would not be provided with insert pins 75. To facilitate presentation of the head in proper registration with the heel in the center plate, dowels 81 may be secured to the arms 49 and be adapted to enter guide holes 83 in the center plate having flaring mouths 85 to facilitate insertion of the dowels into said holes. The construction is such that when the dowels are in the holes the head will be in proper registration with the heel in the center plate. These dowels and holes are also useful in facilitating registration of the head with the heel in the center plate when the head is provided with the insert pins 75.

It will be understood that the invention is not limited to the specific apparatus disclosed herein, and that various deviations may be made therefrom without departing from the spirit and scope of the appended claims:

I claim:

1. Apparatus for making heels comprising, in combination, a mold having an insert plate, a boss plate and a center plate having a heel shaped hole therein, said plates being adapted to be subjected to pressure thereby to press a biscuit and form a heel in the mold with flanges projecting out from the heel between the plates, a trimmer plate having a hole therein for registration with the center plate hole, and an ejector having a heel shaped head for engagement with one face of the heel said ejector having a hammer for imparting a blow to drive the heel through the center plate and trimmer plate holes thereby to shear the flanges from the heel.

2. Apparatus for making heels comprising, in combination, a mold including a center plate having a heel-forming hole therein, a trimmer plate having a hole for registration with the center plate hole, and an ejector for forcing a heel from the center plate hole through the trimmer plate hole, thereby to shear a flange of excess material from the heel.

3. Apparatus for making heels comprising, in combination, a mold having an insert plate with pins projecting therefrom for forming nail holes in a heel, a boss plate having a projection thereon for forming the boss face of the heel, a center plate having a heel shaped hole therein, said mold being adapted to receive a biscuit and when subjected to pressure cause the biscuit to fill the space in the mold and cause flanges to project from the heel between the plates, a trimmer plate having a hole therein for registration with the center plate hole, and an ejector for forcing the heel through the holes in the center plate and trimmer plate, thereby to shear the flanges from the heel.

4. Apparatus for making heels comprising, in combination, a mold including a center plate having a heel-forming hole therein, and a trimmer plate having a hole for registration with the center plate hole, and an ejector for forcing a heel from the center plate hole through the trimmer plate hole, thereby to shear a flange of excess material from the heel, said trimmer plate hole having an enlarged portion to facilitate passage of the heel therefrom.

5. Apparatus for making heels comprising, in combination, a mold including a center plate having a heel-forming hole therein, a trimmer plate having a hole for registration with the center plate hole, and an ejector having a head for forcing a heel from the center plate hole and having means for engagement with the center plate to limit the movement of the ejector head into the trimmer plate hole.

6. An ejector comprising a handle, a head having insert pins projecting therefrom adapted for entrance into nail insert holes in a heel in a mold plate, and a hammer mounted on the handle and adapted to slide along the latter to impart a blow to the ejector to force the heel from the plate.

7. A trimming ejector comprising a handle, a head on the handle shaped to fit into a heel receiving hole of a mold plate, and a hammer mounted on the handle and slidable along the latter to impart a blow for causing the head to eject the heel from the mold plate.

8. An ejector for forcing a heel from a hole in a mold plate comprising a handle, a head on the handle, and a hammer mounted on the handle and slidable along the same to impart a blow to the head.

9. An ejector for forcing a heel from a hole in a mold plate comprising a handle, a head on the handle, a hammer slidable on the handle to impart a blow to the head and means for limiting movement of the head on receiving the blow.

10. An ejector for forcing a heel from a hole in a mold plate comprising a handle, a head shaped to fit the mold plate hole, and a hammer slidable along the handle to impart a blow to the head for causing the latter to enter the mold plate hole and shear a flange from the heel.

11. An ejector for forcing a heel from a hole in a mold plate comprising a handle, a head, means detachably to connect the head to the handle, and a hammer slidable on the handle to impart a blow to the head for ejecting the heel from the mold plate hole.

12. In apparatus for making heels, a trimmer plate having a heel shaped hole therein provided with a shearing edge, and an ejector having a heel shaped head adapted to fit into the hole in the trimmer plate, said plate and ejector head being adapted to receive a mold plate between them and force a heel from a hole in the mold plate through a hole in the trimmer plate, thereby to shear flanges of excess material from the heel.

13. In apparatus for making heels, a center plate having a heel forming hole therein, a trimmer plate having a hole for registration with the center plate hole and an ejector having a head for forcing a heel from the center plate hole through the trimmer plate hole, said ejector and center plate having means adapted to cooperate to guide the ejector head into registration with the center plate hole.

14. In apparatus for making heels, a center plate having a heel forming hole therein, a trimmer plate having a hole for registration with the center plate hole and an ejector having a head for forcing a heel from the center plate hole through the trimmer plate hole, said center plate and ejector head having dowels on one and holes in the other, said dowels being adapted to enter said holes to guide the head into registration with the center plate hole.

ARTHUR C. HAYDEN.